March 20, 1951 C. U. BALLARD 2,546,055
COMPENSATOR

Filed Sept. 2, 1944 3 Sheets-Sheet 1

Inventor
CHARLES U. BALLARD
By Hazard and Miller
Attorneys

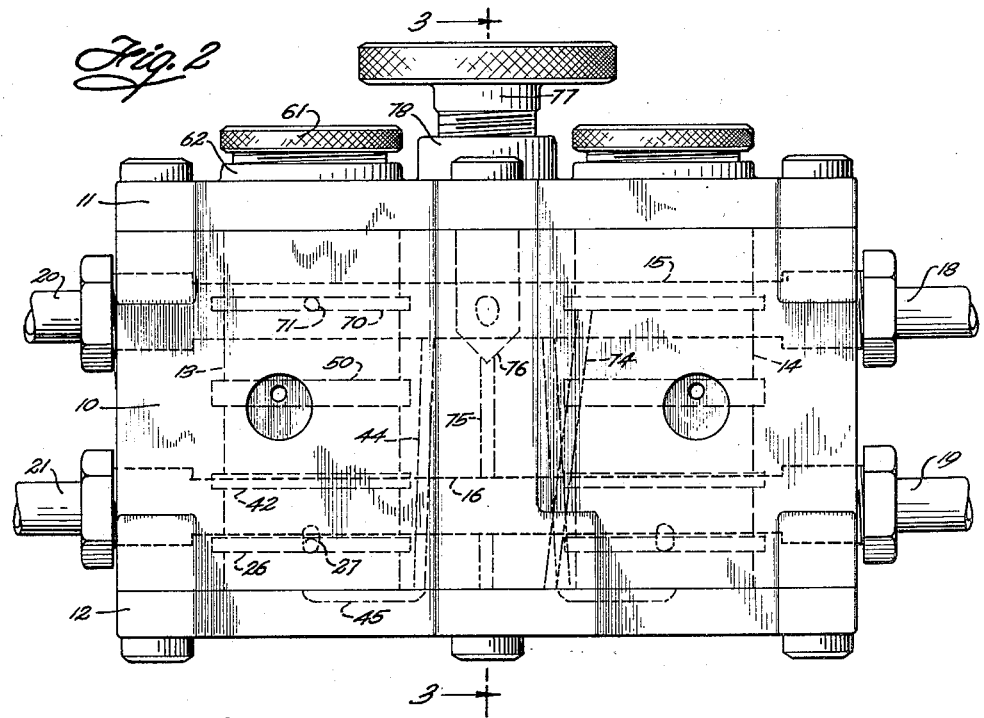
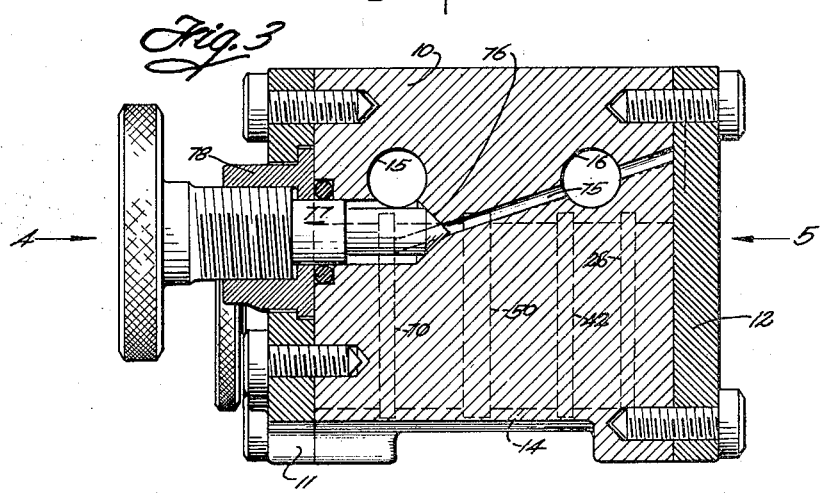

March 20, 1951  C. U. BALLARD  2,546,055
COMPENSATOR
Filed Sept. 2, 1944  3 Sheets-Sheet 3
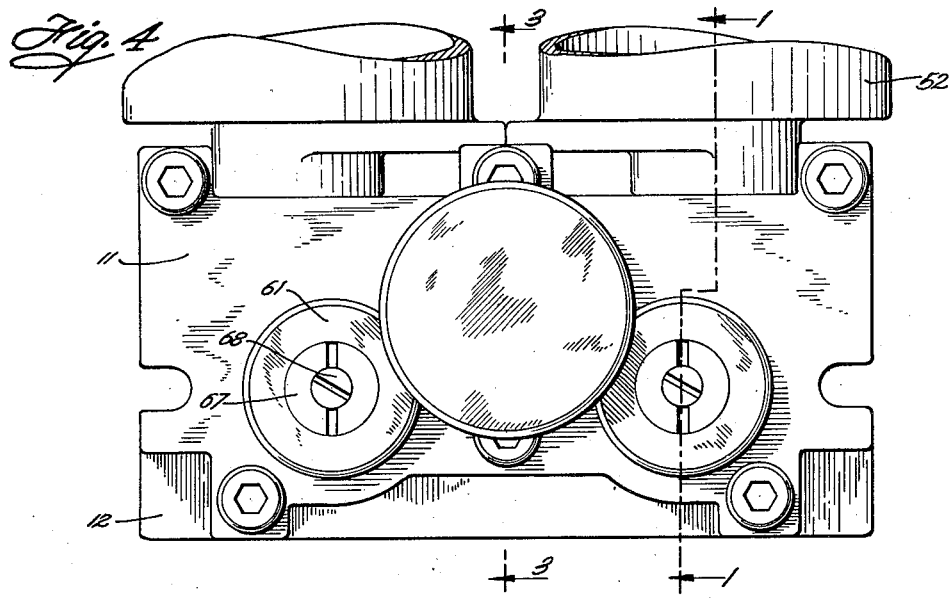
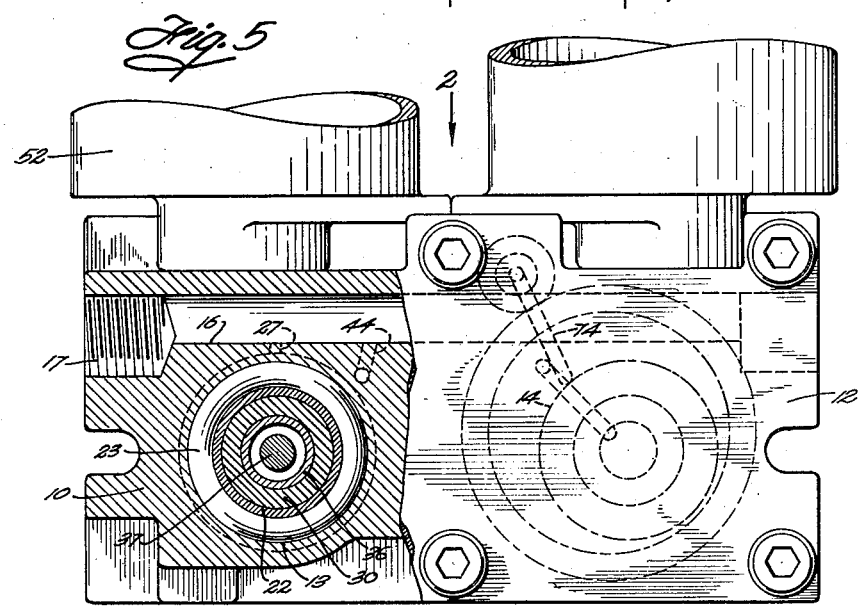
Inventor
CHARLES U. BALLARD
By Hazard and Miller
Attorneys Patented Mar. 20, 1951

2,546,055

UNITED STATES PATENT OFFICE 2,546,055

COMPENSATOR

Charles U. Ballard, Inglewood, Calif.

Application September 2, 1944, Serial No. 552,400

14 Claims. (Cl. 138—31)

This invention relates to a compensator for use in conjunction with telemotor systems, and may be regarded as an improvement over the disclosure made in my United States Letters Patent No. 2,287,960, issued June 30, 1942.

In telemotor systems a compressor or pump supplies an incompressible liquid through one conduit to one side of a motor or actuator while a second conduit returns liquid from the motor or actuator back to the compressor or pump. It is desirable in such telemotor systems to maintain the conduits, compressor, and motor completely filled with liquid at all times, and usually under some pressure so that no lost motion is present between the compressor and motor. Circumstances and conditions to which the telemotor system may be subjected are such that the incompressible liquid may be caused to expand, such as by a rise in temperature. At other times the volume of the liquid in the system may be caused to decrease, such as by drop in temperature or leakage. Accumulators may be provided which provide a reservoir of the liquid that is constantly urged into the system to take care of circumstances and conditions wherein the volume of liquid in the system is caused to contract. Provision must be made, however, for permitting egress from the system under those circumstances where the volume of liquid is caused to expand without releasing the entire pressure from the system which may be working at the time that expansion of the liquid takes place.

My prior patent, above-mentioned, discloses an apparatus wherein liquid in the system may be released to an accumulator whenever pressure in both conduits connecting the compressor or pump to the motor or actuator exceeds a predetermined degree due to expansion and for returning liquid from the accumulator to the system whenever pressure in the system falls below a predetermined degree, such as may be occasioned by contraction. Although egress and ingress from and to the system are possible at all times to take care of expansion and contraction, excessive pressure in one conduit only that connects the actuator with the compressor will not cause the compensator to function. Consequently, the system may serve to transmit hydraulic pressure from the compressor to the actuator at all times, and in either direction without expelling liquid from the system and it is only when excessive pressures are present in both conduits that egress from the system is permissible.

An object of the present invention is to provide an improved compensator for performing these functions which is of greatly simplified and highly compact construction.

Another object of the invention is to provide an improved compensator wherein adjustment of the parts is readily accomplished from the exterior of the compensator.

With the foregoing and other objects in view which will be made manifest in the following detailed description and specifically pointed out in the appended claims, reference is had to the accompanying drawings for an illustrative embodiment of the invention, wherein:

Fig. 2 is a top plan view of the improved compensator the accumulators being shown as having been removed;

Fig. 3 is a transverse vertical section taken substantially upon the line 3—3 upon Fig. 2, in the direction indicated;

Fig. 4 is a partial view in side elevation of the improved compensator and may be regarded as having been taken in the direction of the arrow 4 on Fig. 1; and Fig. 5 is a view in side elevation, parts being broken away and shown in vertical section, this view being taken in the direction of the arrow 5 upon Fig. 1.

Figure 1:
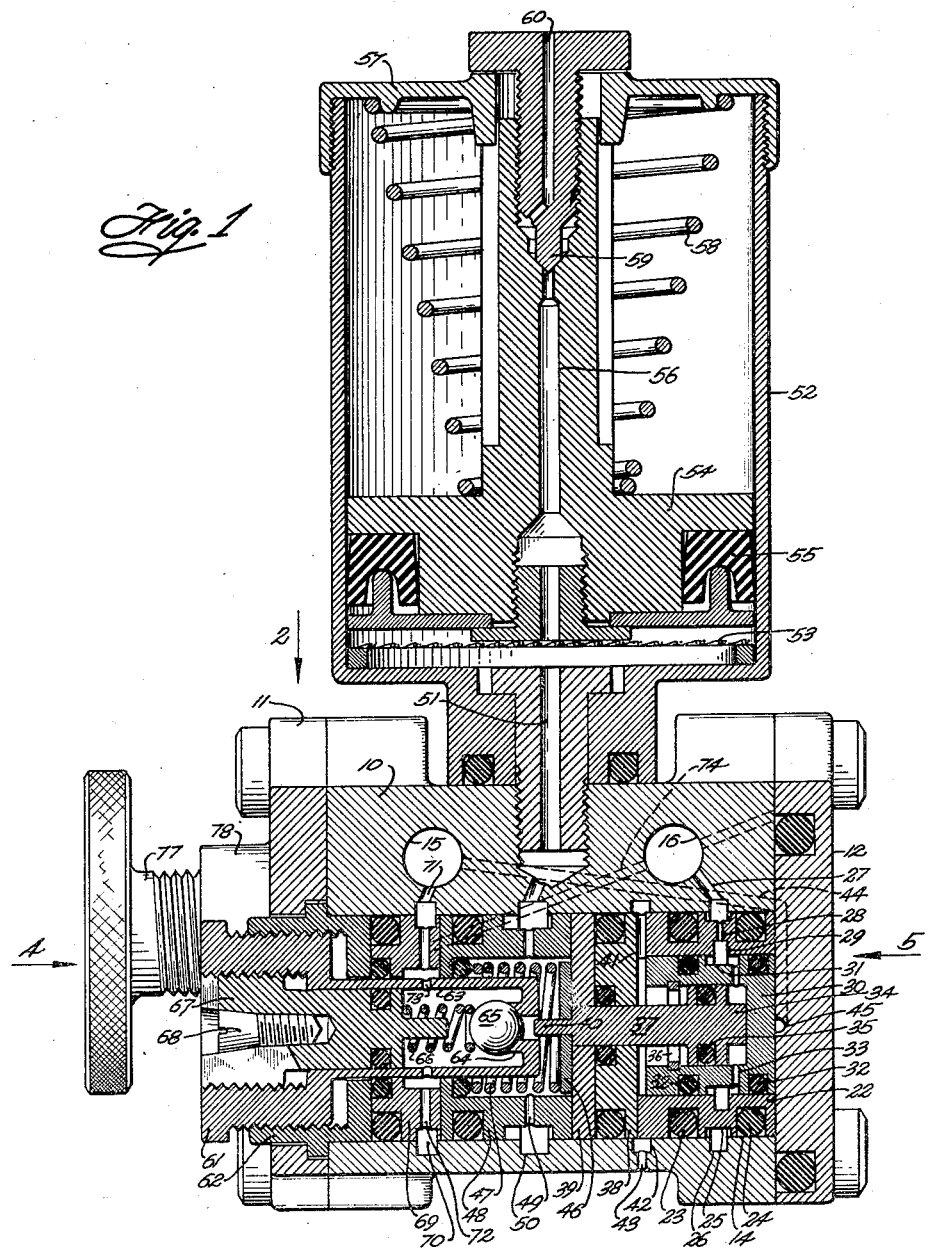
Figure 1 is a transverse vertical section through one side of the improved compensator embodying the present invention, and may be regarded as having been taken substantially upon the line 1—1 upon Fig. 4.

Referring to the accompanying drawings wherein similar reference characters designate similar parts throughout, the improved compensator comprises a suitable body, generally indicated at 10, having side plates 11 and 12 secured thereto which serve to close the ends of two transversely extending bores 13 and 14. A pair of bores 15 and 16 extend longitudinally through the body and may have their ends internally threaded, as indicated at 17, see Fig. 5, for connection in conduits 18 and 19 that may lead from the pump or compressor of a telemotor system and conduits 20 and 21 that may lead to a motor or actuator. It will be understood that when the pump or compressor is operated in one direction liquid will flow through conduit 19 and 21 to the motor or actuator to actuate it accordingly, and that during this period liquid is being returned from the other side of the motor or actuator through the conduit 20 and 18 to the pump or compressor. When the pump or compressor is reversely operated liquid is being transmitted through the conduit 18 and 20 to the motor or actuator and is being returned through the conduit 21 and 19. The construction in each of the bores 13 and 14 is substantially the same and consequently a description of the construction in the bore 14 only which is illustrated in Fig. 1 will suffice for both. In this bore there is positioned against the plate 12 an outer sleeve or bushing 22 that is externally recessed to accommodate packing rings 23 and 24 on opposite sides of a groove 25 that is disposed opposite an annular groove 26 formed in the walls of the bore 14. Groove 26 is in constant communication with bore 16 through means of a small drilled hole 27. The pressure in bore 16 is transmitted through hole 27 and groove 26 through one or more perforations 28 to the interior of the bushing or sleeve 22 opposite a groove 29 formed therein. The sleeve or bushing 22 provides a cylinder within which is reciprocable between limits a piston 30. This piston has an external groove 31 that is in constant communication with groove 29. Packing rings 32 are mounted on this piston on both sides of the groove 31 to prevent leakage therefrom and cause the pressure transmitted to groove 31 to be transmitted through one or more holes 33 to the interior of the piston. Within the outer piston 30 there is disposed an inner piston 34 that is equipped with packing 35. This piston has its face subjected to the pressure transmitted through the hole 33 this being the same pressure as that existing in the bore 16. The piston 34 is limited in its movements by the head of piston 30 in one direction and by a split expansible ring 36 occupying a groove on the interior of piston 30. Piston 34 carries a stem 37 which slidably extends through two partitions 38 and 39. The end of the stem is shouldered adjacent a pin 40. Partition 38 is equipped with suitable packing rings that pack off around the stem 37 and against the interior of bore 14. The inner end of the bushing or sleeve 22 is apertured or recessed as at 41 to communicate with groove 42 that is equipped with a bleed hole 43 so that no fluid may be entrapped between either of the pistons 30 or 34 and partition 38 that would interfere with the movements of these pistons. In the body 10 there is formed a passage 44 which communicates with a passage 45 on the inner face of plate 12. This passage leads to the face of piston 30 so that pressure existing in bore 15 is transmitted directly to the face of piston 30. In this manner the two pistons 30 and 34 are constantly subjected to the pressures existing in the two bores 15 and 16, respectively, and while the inner face of the head of piston 30 is also subjected to the pressure of bore 16, urging it from left to right as viewed in Fig. 1, inasmuch as the outer face of the head of the piston 30 is of greater area this piston will be moved from right to left whenever there is corresponding pressure in bore 15. Each of the pistons is capable of moving only a short distance. Thus, the movement of piston 30 is limited by partition 38 and the movement of piston 34 is limited by the ring 36.

A plate or washer 46 is shouldered on a stem 37 and a compression spring 47 is effective thereon to constantly urge the stem and consequently both pistons to the extreme ends of their movements as viewed in Fig. 1. The spring 47 is seated within a bushing 48 which has apertures therein indicated at 49 communicating with a groove 50. Groove 50 is in communication at its top with a hollow stem 51 that leads to an accumulator 52. Within this accumulator there may be a screen or strainer 53 and a piston 54 suitably equiped with packing 55. This piston has a hollow stem 56 which is externally splined so as to be slidable through a cover 57 but held against rotation. A spring 58 is compressed between the piston and the cover and serves to constantly urge the piston downwardly causing it to expel liquid from beneath the piston into groove 50 and thence through apertures 49 to the chamber within the bushing 48 in which spring 47 is disposed. In the hollow stem 56 of the piston 54 there is provided a valve seat for a needle valve 59. This needle valve is also hollow as indicated at 60 and on opening this needle valve air in the system may be bled therefrom. Additional liquid can also be supplied to the system through the stem 56 when the needle valve is open whenever occasion requires.

A tubular valve seat-providing member has a threaded head 61 that is threaded into a socket 62 that is held in position against the body 10 by plate 11. This member has a tubular shank 63 which provides a valve seat 64 for a ball valve 65. The valve is urged into seated position by means of a compression spring 66 which is seated on an adjustable plug 67 that is screwed into the threaded head 61 of the tubular valve seat-providing member. The head of this plug is kerfed and split and is internally threaded to receive a tapered screw 68 accessible from the exterior of the device so that on tightening the screw 68 the split head of the plug may be expanded to lock the plug in adjusted position that will impose the desired compression on spring 66 which urges the valve 65 to close. Between the socket 62 and bushing 48 there is a ring 69 that is externally grooved opposite a corresponding groove in the body 10 providing an annular chamber 70. This chamber is in communication with bore 15 as indicated at 71 and passages 72 and 73 formed in the ring and valve seat-providing member respectively conduct fluid and pressure from bore 15 to the interior of the valve-seat-providing member.

During normal operation of the telemotor system, that is when there has been no increase in pressure due to temperature expansion or similar cause, pressure in bore 15 may be quite high while pressure in bore 16 is relatively low under circumstances wherein pressure is being transmitted from the pump or compressor through conduits 18 and 20 and is being returned from the motor or actuator to conduits 21 and 19. Under these circumstances, the pressure of bore 15 becomes effective on the face of piston 30 to move the piston from right to left as viewed in Fig. 1. Such movement of piston 30 will, of course, carry with it piston 34, but as the pressure in bore 16 is relatively low, piston 34 will not be moved against the ring 36. Movement of piston 30 only will produce some movement of pin 40 moving the pin toward the ball valve 65 but without unseating the valve. Consequently, under these circumstances no flow of liquid is permissible from the conduits of the system to the accumulator. Conversely, if pressure in bore 16 is quite high but pressure in bore 15 is correspondingly low, piston 34 will be moved into engagement with ring 36 but piston 30 will not be moved. Under these circumstances pin 40 will move toward the ball valve 65 but will not unseat it. If a temperature expansion of liquid in the system occurs the pressure will increase in both passages or bores 15 and 16 simultaneously. Such increase of pressure in both bores is effective to move piston 30 from right to left its extreme stroke and to also move piston 34 from right to left its extreme stroke. When both pistons are simultaneously moved under the influence of pressure pin 40 has a stroke approximately double that that takes place when either piston is moved alone. Under these circumstances, pin 40 will unseat the ball and permit liquid in the telemotor system to escape therefrom to the accumulator that being permissible via passages 71, 72, 73, and through the open ball valve 65. When fluid thus escapes from bore 15 past the check valve 65 it is effective to raise the piston 54 in the accumulator compressing spring 58. This spring urges the piston 54 downwardly with substantially constant force so that liquid in the accumulator is constantly urged to return to passage 15 past the check valve 65 and passages 73, 72, and 71. Consequently, if the liquid in the telemotor system should contract for any reason there is a constant and automatic refilling of the telemotor system by the accumulator.

While a ball check valve is illustrated it will be understood that other types of check valves could be employed that are capable of being unseated or opened by the pin 40. In some forms of construction it is desirable to throttle or retard movements of liquid from the telemotor system to the accumulator but to facilitate return of liquid from the accumulator to the telemotor system. To this end, hollow stem 51 may be equipped with a valve structure, such as that indicated at 130 on Fig. 6 of my prior patent, above mentioned, that will cause liquid flowing from the telemotor system to the accumulator to be retarded in its rate of flow, but which will facilitate return flow from the accumulator to the telemotor system. The use of such a valve structure is optional.

While there may be situations wherein the use of a single bore 14 and the construction therein contained would suffice in the normal situation there is apt to be a direct relationship between the compressor and pump and the motor or actuator. Thus, if the compressor or pump is operated by a steering wheel for example and the motor or actuator operates a rudder, it is desirable to have a definite position of the steering wheel indicate the position of the rudder. For this reason, the body 10 is preferably equipped with two bores 13 and 14, each of which contain the structure contained in bore 14. The only differences in the constructions of the two ends of the body 10 are as follows: In the case of bore 14, passage 71 connects passage 15 to passage 72, whereas in the case of bore 13, there is no passage 71 and in lieu thereof, there is a passage 74 that connects bore 16 with the exterior of ring 69. In this manner, both conduits between the compressor or pump and the motor or actuator are simultaneously and continuously connected through their respective mechanisms, one of which is shown on Fig. 1 to their respective accumulators and in the event of expansion of the liquid in the two conduits, some liquid is released from each conduit to its accumulator; and in the event of contraction some liquid is returned from the accumulators to their respective conduits. This tends to preserve the relationship between the steering wheel and rudder or other devices operated by the telemotor system.

It is, of course, desirable to be able to adjust the steering wheel with relation to the rudder and to bypass liquid from one side of the compressor to its other side without going through the motor or actuator. To this end, the body 10 is equipped with a central drilled hole 75 connecting passages 16 and 15 and providing a valve seat 76 for a needle valve 77, see Fig. 3. This needle valve is threaded for adjustment toward and away from its seat in a nut 78 held against the body by the plate 11. On opening this valve, fluid may flow directly from passage 15 to passage 16 or vice versa. The valve is normally kept closed and is used only in making an adjustment of the relationship between the compressor and the actuator.

From the above-described construction it will be appreciated that an improved compensator is provided for telemotor systems which is of highly simplified, durable, and compact construction. Adjustments in the two bores 13 and 14 can be readily accomplished from the exterior of the device. The parts within the bores 13 and 14 may be easily manufactured as most of these parts may be formed on screw machines or automatic lathes. The assembly of these various parts and their insertion in their respective bores can also be readily accomplished. Where the telemotor system is used on airplanes and the like where weight is an important factor to be taken into consideration the improved compensator is highly advantageous in that it is of relatively light and compact construction.

Various changes may be made in the details of construction without departing from the spirit and scope of the invention as defined by the appended claims.

I claim:

1. A compensator having a body in which there are passages adapted to be connected to the conduits of a telemotor system, a piston reciprocable in the body between limits and subjected to the pressure existing in one passage, a second piston reciprocable between limits within the mentioned piston and subjected to the pressure existing in the other passage, a valve controlling egress from one of the passages, and means operable only by the combined movements of both pistons for opening said valve.

2. A compensator having a body in which there are passages adapted to be connected to the conduits of a telemotor system, a piston reciprocable in the body between limits and subjected to the pressure existing in one passage, a second piston reciprocable between limits within the mentioned piston and subjected to the pressure existing in the other passage, a valve controlling egress from one of the passages, and means operable by the combined movements of both pistons for opening said valve, said means being incapable of opening said valve upon the movement of either piston alone.

3. A compensator having a body in which there are passages adapted to be connected to the conduits of a telemotor system, a pair of pistons reciprocable between limits within the body, each piston being subjected to pressure existing within one of the conduits, a second piston telescopically arranged within each of the mentioned pistons and subjected to pressure existing in the other conduit, and means operable only by the combined movements of both pistons for opening the conduits for egress.

4. A compensator including a body having passages therethrough adapted to be connected to conduits of a telemotor system, a valve controlling egress from one of the passages, a piston reciprocable within the body between limits subjected to pressure in one of the passages, a second piston reciprocable within the mentioned piston between limits subjected to pressure in the other passage, and a stem on the second piston adapted to open the valve only when both pistons are simultaneously actuated by the pressure in the passages.

5. A compensator including a body having passages therethrough adapted to be connected to conduits of a telemotor system, a valve controlling egress from one of the passages, a valve seat therefor a piston reciprocable within the body between limits subjected to pressure in one of the passages, a second piston reciprocable within the mentioned piston between limits subjected to pressure in the other passage, a stem on the second piston adapted to open the valve when both pistons are simultaneously actuated by the pressure in the passages, and means operable from the exterior of the body for adjusting the valve and its seat toward and away from said stem.

6. A compensator including a body having passages therethrough adapted to be connected to conduits of a telemotor system, a valve controlling egress from one of the passages, a piston reciprocable within the body between limits subjected to pressure in one of the passages, a second piston reciprocable within the mentioned piston between limits subjected to pressure in the other passage, a stem on the second piston adapted to open the valve only when both pistons are simultaneously actuated by the pressure in the passages, and adjustable spring means operable from the exterior of the body for urging the valve to close.

7. A compensator including a body having passages therethrough adapted to be connected to the conduits of a telemotor system, an accumulator, a valve permitting flow from the accumulator to one of said passages and normally preventing flow from the passages to the accumulator, a piston reciprocable within the body between limits subjected to pressure in one of the passages, a second piston reciprocable within the mentioned piston between limits subjected to pressure in the other passage, a stem on the second piston adapted to open the valve when both pistons are simultaneously actuated by the pressures in the passages, and spring means urging the stem out of engagement with the valve.

8. A compensator including a body having passages therethrough adapted to be connected to the conduits of a telemotor system, an accumulator, a valve permitting flow from the accumulator to one of said passages and normally preventing flow from the passages to the accumulator, a piston reciprocable within the body between limits subjected to pressure in one of the passages, a second piston subjected to pressure in the other passage, a stem on the second piston adapted to open the valve when both pistons are simultaneously actuated by the pressures in the passages, and means for adjusting the valve toward and away from its seat.

9. A compensator including a body having passages therethrough adapted to be connected to the conduits of a telemotor system, an accumulator, a valve permitting flow from the accumulator to one of said passages and normally preventing flow from the passages to the accumulator, a piston reciprocable within the body between limits subjected to pressure in one of the passages, a second piston reciprocable within the mentioned piston between limits subjected to pressure in the other passage, a stem on the second piston adapted to open the valve when both pistons are simultaneously actuated by the pressures in the passages, and means for adjusting the valve toward and away from its seat operable from the exterior of the body.

10. A compensator including a body having passages therethrough adapted to be connected to conduits of a telemotor system, a pair of accumulators, valves normally permitting flow from each accumulator to each of said passages but preventing flow from either passage to its respective accumulator, a pair of pistons reciprocable between limits within the body, there being one piston for each passage subjected to the pressure existing therein, second pistons reciprocable within each of the mentioned pistons between limits, the second pistons being subjected to pressures existing in said passages, stems carried by the second pistons engageable to open their respective valves when both pistons are simultaneously actuated, and spring means for urging the stem out of engagement with said valves.

11. A compensator including a body having passages therethrough adapted to be connected to conduits of a telemotor system, a pair of accumulators, valves normally permitting flow from each accumulator to each of said passages but preventing flow from either passage to its respective accumulator, a pair of pistons reciprocable between limits within the body, there being one piston for each passage subjected to the pressure existing therein, second pistons reciprocable within each of the mentioned pistons between limits, the second pistons being subjected to pressures existing in said passages, stems carried by the second pistons engageable to open their respective valves when both pistons are simultaneously actuated, and spring means for urging the stem out of engagement with said valves, there being a passage in the body connecting said passages and a valve operable from the exterior of the body for opening and closing said passages.

12. A compensator including a body having passages therethrough adapted to be connected to conduits of a telemotor system, a pair of accumulators, valves normally permitting flow from each accumulator to each of said passages but preventing flow from either passage to its respective accumulator, a pair of pistons reciprocable between limits within the body, there being one piston for each passage subjected to the pressure existing therein, second pistons reciprocable within each of the mentioned pistons between limits, the second pistons being subjected to pressures existing in said passages, stems carried by the second pistons engageable to open their respective valves when both pistons are simultaneously actuated, and spring means for urging the stem out of engagement with said valves, said valves being adapted to close upon said valve seats, said valves and valve seats being adjustable from the exterior of the body.

13. A compensator including a body having passages therethrough adapted to be connected to conduits of a telemotor system, a pair of accumulators, valves normally permitting flow from each accumulator to each of said passages but preventing flow from either passage to its respective accumulator, a pair of pistons reciprocable between limits within the body, there being one piston for each passage subjected to the pressure existing therein, second pistons reciprocable within each of the mentioned pistons between limits, the second pistons being subjected to pressures existing in said passages, stems carried by the second pistons engageable to open their respective valves when both pistons are simultaneously actuated, and spring means for urging the stem out of engagement with said valves, said valves being adapted to close upon said valve seats, said valves and valve seats being adjustable from the exterior of the body, spring means urging the valves to seat upon their seats, and means for adjusting the last-mentioned spring means.

14. In a compensator, a piston subjected to pressure in one conduit of a telemotor system, a second piston reciprocable therein and subjected to the pressure existing in another conduit of the telemotor system, a stem carried by the second piston having a shoulder thereon, a washer positioned against the shoulder, spring means operable upon the washer to urge the stem in opposition to the pressures existing on the pistons, and a check valve openable by the stem when both pistons are simultaneously actuated by the pressures applied thereto.

CHARLES U. BALLARD.

REFERENCES CITED

The following references are of record in the file of this patent:

UNITED STATES PATENTS

| Number | Name | Date |
|---|---|---|
| 885,459 | Engler | Apr. 21, 1908 |
| 1,612,007 | Furlong | Dec. 28, 1926 |
| 1,786,948 | Hayt | Dec. 30, 1930 |
| 2,170,725 | Mason | Aug. 22, 1939 |
| 2,287,960 | Ballard | June 30, 1942 |